Feb. 19, 1952  R. A. KURTZ  2,586,063
CRASH BARRIER FOR VEHICLE PASSENGERS
Filed June 27, 1949
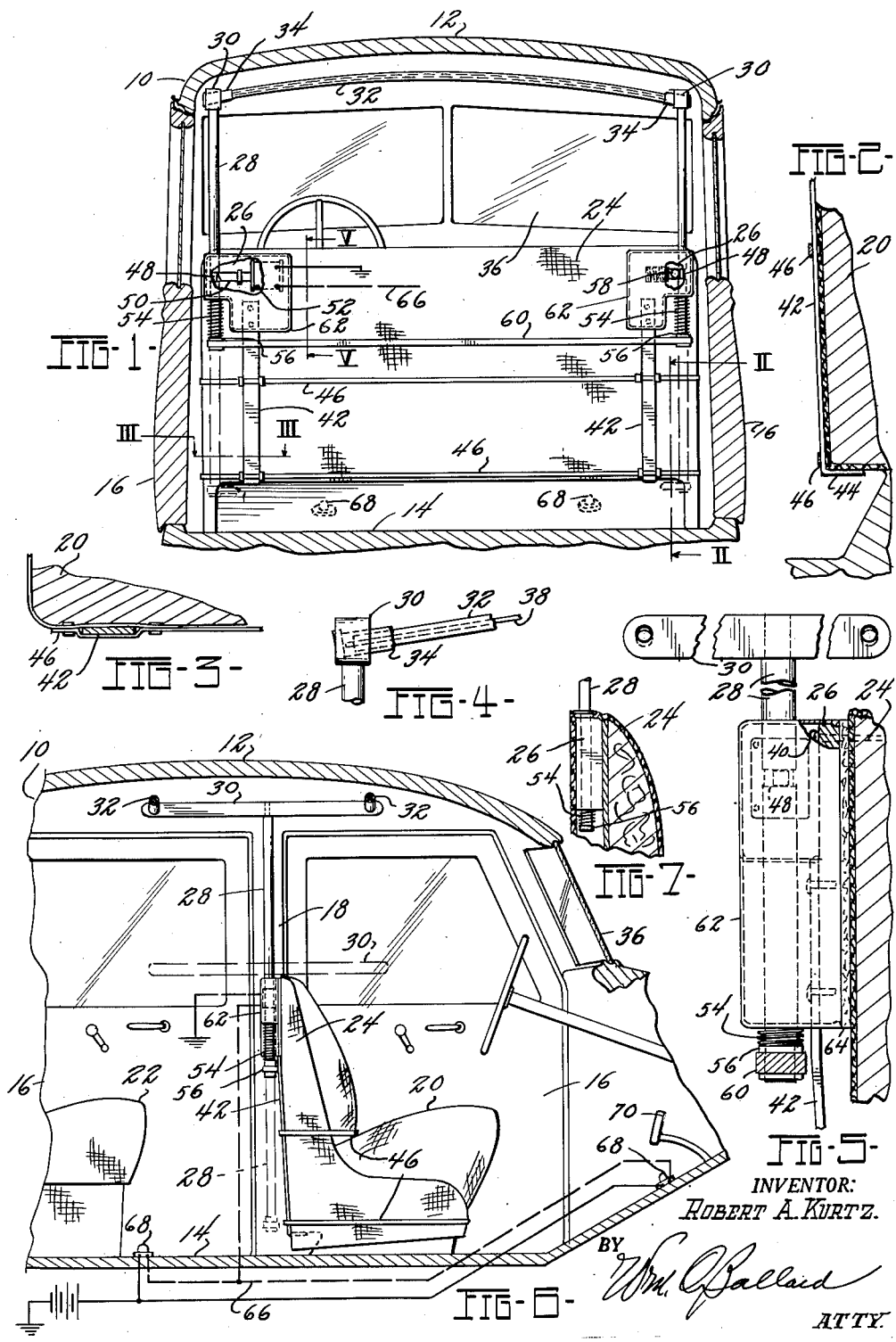
INVENTOR:
Robert A. Kurtz.
BY
Wm. Q. Ballard
ATTY.

Patented Feb. 19, 1952

2,586,063

UNITED STATES PATENT OFFICE 2,586,063

CRASH BARRIER FOR VEHICLE PASSENGERS

Robert A. Kurtz, Fostoria, Ohio

Application June 27, 1949, Serial No. 101,546

6 Claims. (Cl. 280—150)

This invention relates to crash barriers adapted to be mounted within a vehicle for the protection of the passengers therein.

An object of the invention is to provide a crash barrier which, by a simple operation of a rider within the vehicle, in anticipation of an accident, may cause a resilient barrier to be thrown across the path of the driver or other passengers, against which an individual may be thrown, with a minimum of injury.

Another object of this invention is to provide a portable barrier for the interior of a vehicle which may be quickly placed to intercept a rider from being thrown against the windshield or other parts of the car.

Another object of this invention is to provide a crash barrier which will protect the riders in either the front or rear seats of a vehicle or both.

And another object of the invention is to provide a crash barrier which may be installed within a vehicle as an accessory or built thereinto as a permanent part of the structure.

Still another object of the invention is to provide a crash barrier which may be installed within a vehicle without materially detracting from the normal vehicle appearance or operation of any component part and until brought into effective position is entirely out of the way and does not interfere with entrance into or exit from the vehicle nor materially lessen the usable passenger or storage space.

And another object of the invention is to provide an electric operating system controlled from any desired point within the vehicle which may be so predetermined as to be practically involuntarily operated with sufficient speed to furnish a maximum of protection.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings:

Fig. 1 is a section through a passenger vehicle, looking from a rear seat position toward the back of the front or driver's seat;

Fig. 2 is a view on the line II—II, Fig. 1;

Fig. 3 is a view on the line III—III of Fig. 1;

Fig. 4 is a detail of the crash contact element mounting;

Fig. 5 is a view on the line V—V, Fig. 1;

Fig. 6 is a side elevation of a vehicle, parts being broken away to show the interior of the car and showing a form of the invention mounted on the back of a front seat as an accessory; and Fig. 7 is a partial section through a seat back, showing details of the invention built directly into the seat structure.

While the invention is readily adapted for various types of passenger vehicles, for purposes of illustration and description herein, a two seated motor driven vehicle is shown as having body 10 provided with roof 12, floor 14 and doors 16 with a vehicle frame member 18 therebetween.

Front seat 20 supplies the driver's station and usually accommodations for one or more additional passengers. Additional passenger space is provided by the rear seat 22.

By the use of the invention herein, it is proposed to provide a barrier, which is normally out of the way from any of the vehicle passengers, but in anticipation of an accident, a passenger may cause resilient barriers to be moved into position before all the passengers against which they may be thrown by inertia, thereby minimizing injuries. To this end a pair of slide blocks 26 are mounted against back 24 of the front seat 20, one on each side thereof. These blocks provide bearings for vertically shiftable reciprocatory rods 28. Normally heads 30 on the rods are disposed adjacent the roof 12 and carry resilient lines 32 therebetween attached to the heads by suitable connections 34. These heads 30 extend forwardly and rearwardly from the rods 28 forming a T-shaped frame on each side of the car interior with the rod portions adjacent to and in substantial parallelism with the frame members 18. This arrangement places the mechanism out of the way as much as possible, does not interfere with vision through the doors, nor detract from the car's appearance.

Furthermore, it positions a barrier line to descend into position in front of the passengers in both seats between the passengers in the rear and the front seat and between the passengers in the front seat and the windshield 36 or other solid car parts. In position, the barriers are designed to be approximately chest height for the average passenger.

The juxtaposition of the rods 28 and frame elements 18 allow the usual forward seat adjustments without detracting from the car's appearance nor the utilities of the device nor the vehicle components.

The lines 32 may be of low flexibility and high tensile strength materials such as tempered rubber, fibrous materials or may be a nylon rope.

A reinforcement may be incorporated if desired. This reinforcement 38 may add to the strength of the line without materially detracting from the desirable crash or impact qualities. The line may be upholstered to match other interior fittings of the vehicle. It is primarily designed to have sufficient give to break the crash impact without permitting the passenger to contact the car parts.

As an accessory, the blocks 26 may be directly attached to the rear of the seat by screw fastening devices or the like. However, where objections are encountered to drilling into the seat and possible marring, the blocks 26 may be attached to bars or stakes 42 depending toward the floor 14, which bars have terminal offsets 44 engaging ends of the lower edge of the seat 20. In this type of mounting, the fastening means 40 are preferably omitted. The bars 42 may be strapped to the seat by metal tapes 46.

The rods 28 are provided with grooves 48 within the bearing extent. These grooves 48 are engaged by catch elements 50, laterally shiftable by solenoids 52 or other suitable mechanisms. The catch elements 50 normally hold the heads 30 adjacent the roof 12.

Upon withdrawal of the catch elements 50, springs 54 under compression between the slides and heads 56 on the lower termini of the rods, expand to accelerate the gravity fall of the barriers and quickly lower the crash lines into operative position.

One of the solenoids may be replaced by a spring catch mechanism 58 if desired and a stabilizing cross connector 60 be used between the rods. For most installations, one positively released catch 50, coacting with one rod 28, is sufficient to hold the mechanism in its out-of-the-way position, and the ball catch 58 can be used in conjunction therewith as a stabilizing device to hold the other rod against vibration during vehicle operation. When the catch 50 is withdrawn, the expansion force of the springs 54 is far beyond the frictional grip of the ball catch 58 against its respective rod.

Decorative plastic or sheet metal covers 62 may be placed over the slides to house the operating mechanisms and pads 64 such as sponge rubber sheets may be placed between the slides and seat upholstery for protection thereof.

For convenience, one side of the solenoids 52 may be to ground. The other side is connected by line 66 to one or more switches 68 positioned at predetermined places within the vehicle in easy access to the passengers. From the switches, the line 66 continues to a live connection with the car battery.

A single switch 68 is primarily desired to be located adjacent an operating pedal 70 for the car, the brake, clutch or accelerator. A second switch may be disposed in the front for operation by a passenger other than the driver and one or more switches located in the rear.

As a built-in feature, the slides 26 may be assembled within the seat back 24 as an integral part of the frame (Fig. 7).

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed and is desired to secure by United States Letters Patent:

1. A crash barrier for vehicle passengers comprising a pair of vertically shiftable supports, one disposed on each side of a passenger station within the vehicle which station includes a seat having a back, said supports including extensions over and forwardly as to said seat, a bearing mounted on the seat back for slidably mounting each support, spring means operative between said supports and said seat for normally urging said supports downwardly, a catch carried by said seat for engaging one of said supports to hold said supports against movement downwardly, a remote control, an interconnection between said remote control and said catch, said control operable to release the catch and thereby permit said spring means to shift said supports downwardly, and a resilient line normally carried by and between said extensions above the passenger station, said line movable into a position in front of said passenger station by the downward movement of said supports.

2. A crash barrier for a vehicle seat comprising a pair of slides one mounted to each side of said seat, a vertically reciprocal support through each slide, means carried by said seat for holding said supports in an extended position upwardly from the slides, means operable to release the holding means, means for shifting said supports toward the seat upon operation of the release, an extension from the upper portion of each support forwardly as to the seat, and a resilient line connection between said extensions.

3. The structure set forth in claim 2 including additional extensions rearwardly from said supports with a resilient connection therebetween for fencing the rear of said seat.

4. In a motor vehicle having a frame and provided with a front and rear seat, said frame including a member on each side thereof extending upwardly toward the roof of the vehicle in the region of the front seat to provide portions of the door structure for the vehicle, a rod positioned inside said vehicle in parallel juxtaposition to each of said vehicle frame members and in spaced relationship on each side of said front seat, a slide bearing for each rod mounted on said front seat, said rods in their upwardly extended positions terminating adjacent said roof, a cross-bar on each rod mounted adjacent said termini and extending therefrom forwardly in the vehicle and rearwardly therefrom, a pair of crash elements mounted by said cross-bars, one by the forwardly extending portions of the cross-bars and the other by the rearwardly extending portions of the cross-bars, a catch mechanism carried by said front seat including means for engaging one of said rods to normally hold the crash elements adjacent the car roof, a solenoid in said mechanism for releasing said catch from said rod, means operable between said rods and front seat for shifting said rods downwardly upon release of said catch, a circuit for said solenoid, and a switch in said circuit positioned in said vehicle to be operated by a passenger therein.

5. In combination, a vehicle having a driver's station including a seat having a back, doors for access to said vehicle having frame portions laterally spaced from the back of said seat and in substantial alignment therewith; a crash barrier for the occupants of said seat comprising a pair of vertically shiftable supports, one disposed on each side of the seat within the space between said seat and door frames, extensions from said supports forwardly over the line of the seat back, a bearing for slidably mounting each support, means for mounting said bearings on the back of said seat, spring means operable between said bearings and supports normally urging said supports downwardly, catch means carried by said seat engaging at least one of said supports to hold said supports against movement downwardly, a remote control, an interconnection between said remote control and said catch means, said control operable to release the catch and thereby permit said spring means to shift said supports downwardly, and a resilient line normally carried by and between said extensions above the driver's station, said line movable into a position in front of said driver's station by the downward movement of said supports.

6. The structure set forth in claim 5 wherein the means for mounting said bearings on the back of the seat include strap means embracing a portion of the seat structure.

ROBERT A. KURTZ.

REFERENCES CITED

The following references are of record in the file of this patent:

UNITED STATES PATENTS

| Number | Name | Date |
|---|---|---|
| 2,025,822 | Pryor | Dec. 31, 1935 |
| 2,108,303 | Beddow | Feb. 15, 1938 |
| 2,267,373 | Carlisle | Dec. 23, 1941 |
| 2,469,159 | Dombrowiak | May 3, 1949 |